United States Patent [19]

Bregoli et al.

[11] Patent Number: 4,810,594

[45] Date of Patent: Mar. 7, 1989

[54] FUEL CELL ELECTRODE AND METHOD OF MAKING AND USING SAME

[75] Inventors: Lawrence J. Bregoli, Southwick, Mass.; Francis J. Luczak, Glastonbury, Conn.

[73] Assignee: International Fuel Cells Corporation, South Windsor, Conn.

[21] Appl. No.: 177,810

[22] Filed: Apr. 7, 1988

Related U.S. Application Data

[63] Continuation of Ser. No. 49,354, May 14, 1987, abandoned.

[51] Int. Cl.$^4$ .................. H01M 4/88; H01M 8/04
[52] U.S. Cl. .......................... 429/13; 429/42; 502/101
[58] Field of Search ................ 429/13, 40, 42, 44; 427/113, 115, 117; 502/101; 29/623.5; 252/182.1; 264/29.1, 105

[56] References Cited

U.S. PATENT DOCUMENTS

| | | | |
|---|---|---|---|
| 3,410,935 | 11/1968 | Okrent | 264/85 |
| 3,438,815 | 4/1969 | Giner | 429/42 |
| 3,457,113 | 7/1969 | Deibert | 429/13 |
| 3,857,737 | 12/1974 | Kemp et al. | 252/182.1 |
| 3,937,179 | 2/1976 | Goodridge | 118/301 |
| 3,972,735 | 8/1976 | Breault | 252/182.1 |
| 4,175,055 | 11/1979 | Goller et al. | 502/101 |
| 4,177,159 | 12/1979 | Singer | 252/428 |
| 4,202,934 | 5/1980 | Jalan | 429/40 |
| 4,233,181 | 11/1980 | Goller et al. | 502/101 |
| 4,287,232 | 12/1981 | Goller et al. | 427/113 |
| 4,293,396 | 10/1981 | Allen et al. | 429/42 X |
| 4,313,972 | 2/1982 | Goller et al. | 427/115 X |
| 4,316,944 | 2/1982 | Landsman et al. | 429/44 |
| 4,337,140 | 6/1982 | Solomon | 204/292 |
| 4,350,608 | 12/1982 | Gestaut | 502/101 |
| 4,362,790 | 12/1982 | Blanchart et al. | 429/42 |
| 4,426,340 | 1/1984 | Goller et al. | 264/29.1 |
| 4,447,506 | 5/1984 | Luczak et al. | 429/44 |
| 4,469,808 | 12/1984 | Korach | 502/101 |
| 4,506,028 | 3/1985 | Fukuda et al. | 502/101 |
| 4,513,094 | 4/1985 | Luczak | 502/101 |
| 4,543,174 | 12/1985 | Beer et al. | 204/290 |
| 4,602,426 | 7/1986 | Kampe et al. | 29/623.1 |

OTHER PUBLICATIONS

Satoshi Motuo et al., "Gas Diffusion Electrode of High Performance", J. Electroanal. Chem 160 (1984) 351–357.

Primary Examiner—Anthony Skapars
Attorney, Agent, or Firm—Kevin E. McVeigh

[57] ABSTRACT

A method for making a fuel cell electrode is disclosed. A layer of hydrophobic polymer and an electro-catalyst is deposited on the surface of a porous electrode substrate and press-sintered by heating the catalyst layer to a temperature between the melting point and decomposition temperature of the polymer and simultaneously compressing the layer at a pressure between 20 pounds per square inch and 100 pounds per square inch. The heating and compressing are continued for a time period of between 10 minutes and 20 minutes. A fuel cell electrode made by the above method and a method for generating electricity using such an electrode are also disclosed. A press-sintered fuel cell electrode provides improved peak performance as well as improved tolerance to electrolyte solidification.

3 Claims, 1 Drawing Sheet

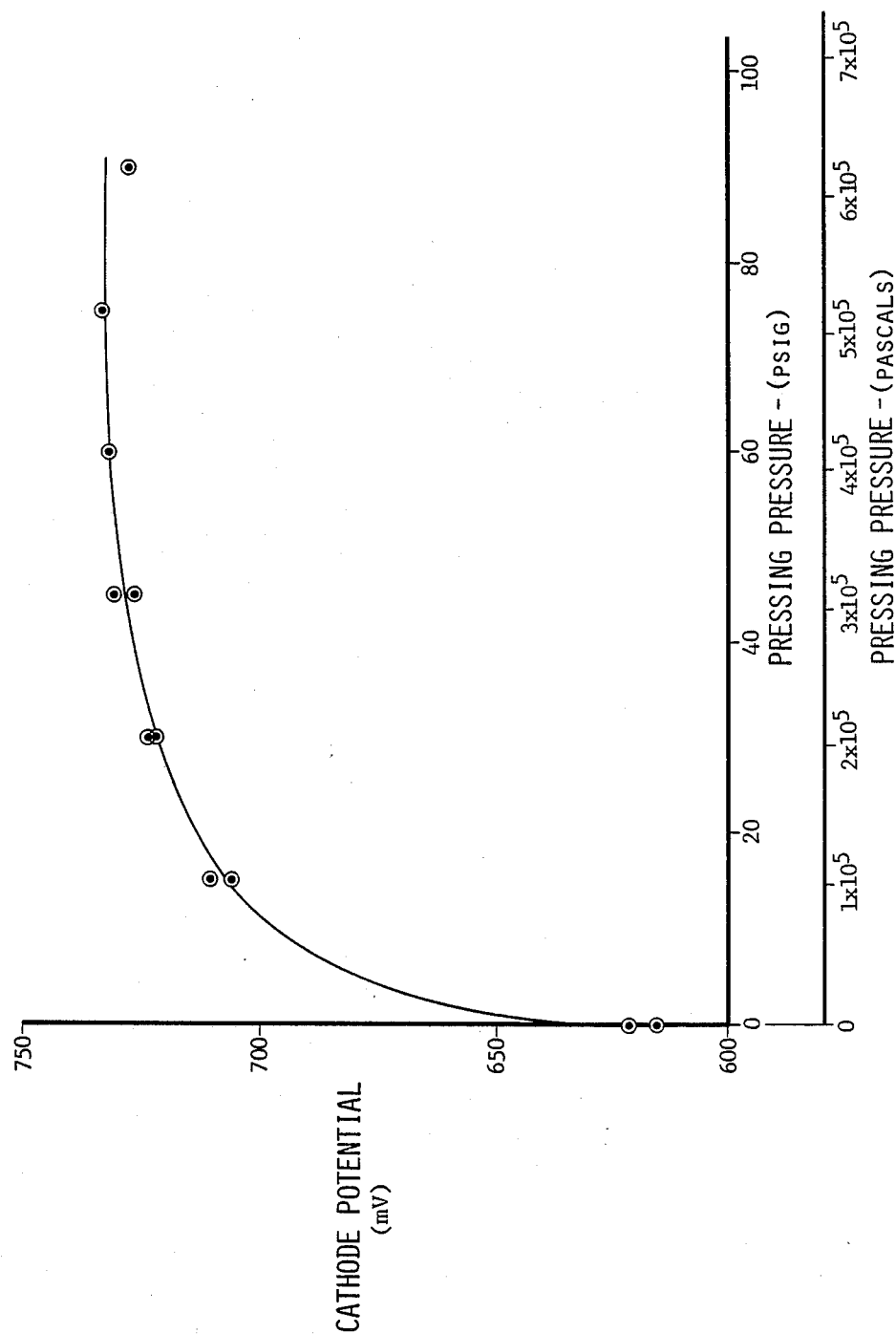

FUEL CELL ELECTRODE AND METHOD OF MAKING AND USING SAME

This application is a continuation of Ser. No. 049,354, filed May 14, 1987, now abandoned.

DESCRIPTION

1. Technical Field

The field of art to which this invention pertains is fuel cell electrodes.

2. Background Art

A fuel cell is a device for directly converting the chemical energy of a fuel into electrical power.

A fuel cell comprises two gas diffusion electrodes, an anode and a cathode, and an electrolyte impregnated matrix. The matrix is disposed between the two electrodes. A catalyst layer is disposed on electrolyte-facing surface of each electrode.

In the operation of a typical fuel cell, a hydrogen-containing gas is fed to the back surface of the anode and an oxygen-containing gas is fed to the back surface of the cathode. The gases diffuse through the electrodes to react at catalyst sites to yield water, heat, and electrical energy.

On the anode side of the cell, hydrogen is electrochemically oxidized to give up electrons. The electrical current so generated is conducted from the anode through an external circuit to the cathode. On the cathode side of the cell, the electrons are electrochemically combined with the oxidant. A flow of ions through the electrolyte completes the circuit.

Several types of fuel cells have been developed and may be broadly categorized according to the type of electrolyte used, for example, acid cells, alkaline cells and molten carbonate cells. Acid cells using concentrated phosphoric acid as the electrolyte are the most commercially advanced of the various fuel cells.

There is a constant search in the art for ways in which to improve fuel cell performance. A particular problem is presented in the case of phosphoric acid cells. Phosphoric acid cells typically operate at temperatures in the range of 325° F.–425° F. The electrolyte is liquid at the operating temperature of the cell. Under some circumstances, the cell must be shut down and cooled to room temperature. The concentrated phosphoric acid electrolyte can solidify upon cooling. The solidification of the electrolyte during shutdown of the cell has a detrimental effect on the cell electrodes that results in lowered cell performance in subsequent operating cycles. In the case of a planned shutdown, the concentrated phosphoric acid electrolyte is typically diluted prior to shutdown to avoid electrolyte solidification and the associated problems. However, such dilution is not always possible as, for example, in the case of an emergency shutdown. Since unplanned shutdowns are possible, it is desirable that the electrodes be tolerant of electrolyte solidification.

A conventional approach toward improving the tolerance of electrodes to electrolyte solidification is to increase the hydrophobicity of the catalyst layer as, for example, by increasing the relative amount of hydrophobic polymer in the layer. However, this approach also reduces the peak performance of the electrode.

What is needed in this art is a fuel cell electrode that overcomes these difficulties to give improved peak performance and, in the case of phosphoric acid cells, improved tolerance of electrolyte solidification.

DISCLOSURE OF THE INVENTION

A method for making a fuel cell electrode is disclosed. The method comprises applying a catalyst layer comprising a hydrophobic polymer and an electrocatalyst to one surface of a porous substrate, heating the layer at a temperature between the sintering temperature and the decomposition temperature of the polymer while simultaneously compressing the layer at a pressure between 20 pounds per square inch and 100 pounds per square inch and continuing the heating and compressing for a time period of between 10 minutes and 20 minutes. A fuel cell electrode made by the process of the present invention provides increased peak performance as well as improved performance stability.

Another aspect of the invention is a fuel cell electrode made by the above process.

A further aspect of the invention is a method for generating electric current. The method comprises feeding streams of a fuel and an oxidant to a fuel cell, said fuel cell having two electrodes and an electrolyte containing matrix between the electrodes, wherein each electrode has a catalyst layer coating one surface of a porous substrate, oxidizing the fuel at the catalyst layer of one electrode to generate a stream of electrons, conducting the electrons to a second electrode, combining the electrons with the oxidant at the catalyst layer of the second electrode, and transferring ionic species through the electrolyte to complete the circuit, wherein the improvement comprises using an electrode made according to the above process as at least one of the electrodes in the fuel cell.

The foregoing and other features and advantages of the present invention will become more apparent from the following description.

BRIEF DESCRIPTION OF THE DRAWINGS

The FIGURE shows cathode potential during use versus the pressing pressure applied during the press sintering process.

BEST MODE FOR CARRIYNG OUT THE INVENTION

While any porous substrate that is compatible with the fuel cell environment may be used with the present invention, substrates already successfully used in fabricating fuel cell electrodes are preferred substrates. Carbon paper is the particularly preferred substrate for fabricating electrodes to be used in phosphoric acid cells.

Carbon paper suitable for use as the substrate of the present invention may be purchased or prepared. Suitable carbon papers are available from a number of commercial sources, for example, Union Carbide Corp., Stackpole Carbon Company and Kureha Corporation.

Carbon paper substrates may be prepared from resin bonded carbon fibers by known paper making techniques as disclosed in commonly owned U.S. Pat. No. 3,972,735. Such carbon papers can be wetproofed by impregnation with hydrophobic polymer. The wetproofing allows gas flow through the substrate while allowing the substrate to simultaneously hold electrolyte in order to accommodate electrolyte volume changes during cell operation.

A preferred method for preparing carbon paper substrates is the process taught by commonly owned U.S. Pat. No. 4,426,340, the disclosure of which is incorporated herein by reference. Electrode substrates prepared by the preferred process do not require wetproofing, as the flow of gases and flow of electrolyte through the substrate are controlled by selection of the porosity and pore size distribution within the substrate. Briefly, the process comprises selecting a dry mixture of carbon fibers and thermosetting resin, depositing the mixture in a mold, and then heating and compacting the mixture to bond the fibers. The article so formed is then carbonized in an inert atmosphere by increasing the temperature at a rate of about 40° C. per hour to 950° C. and holding at 950° C. for about 1 hour. The substrate may then be graphitized by heating at 2800° C.

The preferred process provides considerable latitude in the design of electrode substrates and allows selection of porosity and pore sizes that are adopted to specific applications. In general, it is desirable to maximize the porosity of the substrate while preserving the physical strength of the substrate. Carbon substrates having a porosity of between 65% and 80% are preferred with porosity between 70% and 80% being most preferred for the practice of the present invention. The selection of a particular pore size distribution depends upon the design of the particular cell and may be determined by conventional fuel cell design techniques. A mean pore size of between 20 microns and 70 microns is preferred for the practice of the present invention.

The catalyst layer of the present invention comprises a mixture of hydrophobic polymer and an electro-catalyst.

The hydrophobic polymer of the present invention may be any hydrophobic polymer compatible with the electrolyte to be used in the fuel cell. Compatible fluorinated polymers, such as PTFE and fluorinated ethylene propylene (FEP), having molecular weights of about $1 \times 10^6$ or greater are preferred. PTFE is most preferred and most widely used in the art. Suitable PTFE polymers are TFE-6 or TFE-30, each manufactured by DuPont. TFE-6 is a dry powder having a molecular weight of about $1 \times 10^6$ and a particle size of greater than 100 microns. The TFE-30 is an aqueous dispersion of about 0.2 micron size PTFE particles with a surfactant.

Noble metals and alloys of noble metals are suitable catalysts for use with the present invention. Platinum is the preferred catalyst for use as the anode catalyst. The platinum may be dispersed upon support by conventional methods, for example, those disclosed in commonly owned U.S. Pat. Nos. 3,857,737 and 4,040,193. Binary alloy catalysts, such as platinum-vanadium and platinum-chromium, and ternary alloy catalysts, such as platinum-chromium-cobalt are preferred for use as cathodic catalysts. Methods of making platinum-vanadium catalysts are disclosed in commonly owned U.S. Pat. Nos. 4,202,934 and 4,513,094, a method of making platinum-chromium catalysts is disclosed in commonly owned U.S. Pat. No. 4,316,944 and a method of making platinum-chromium-cobalt catalysts is disclosed in commonly owned U.S. Pat. No. 4,447,506. The disclosures of the above cited U.S. Patents are incorporated herein by reference.

The catalyst of the present invention is preferably dispersed upon an electrically conductive support material having a specific surface area of greater than about 50 m²/gram.

Carbon blacks, such as acetylene black, and oil blacks are preferred catalyst supports. An oil black known as Vulcan XC-72, available from Cabot Corp., is the most preferred catalyst support. While the as-received carbon black is the preferred support for the anode catalyst, it has been found that graphitized carbon black is preferable for the cathode catalyst support due to its better resistance to corrosion. Carbon black particles may be graphitized by heating at a temperature between 2500° C. and 2700° C. for about 1 hour in an inert atmosphere.

The hydrophobic polymer and catalyzed carbon particles may be blended by any convenient technique that will produce a uniform mixture. For example, an aqueous co-suspension may be formed by conventional techniques, such as agitating mixture of catalyzed carbon particles, an aqueous dispersion of PTFE particles and water in a commercial Waring blendor. The aqueous suspension is then caused to floc, for example, by heating or by adding a floccing agent.

Alternatively, the aqueous co-dispersion may be flocced, dried and pulverized to produce a dry, powdered mixture of polymer and catalyzed carbon, as described in commonly owned U.S. Pat. No. 4,287,232. A dry mixture of polymer and carbon particles may also be produced by blending and pulverizing a mixture of dry hydrophobic polymer powder and catalyzed carbon particles as disclosed in commonly owned U.S. Pat. No. 4,175,055. A process for preparing a dry mixture of hydrophobic polymer and catalyzed carbon that is preferred for continuous production is disclosed in commonly owned U.S. Pat. No. 4,233,181.

The hydrophobic polymer and catalyzed carbon may be applied to the substrate using such conventional techniques as direct filtration or filter transfer.

The preferred method for applying the hydrophobic polymer and catalyzed carbon to the substrate is the cloud chamber technique disclosed in commonly owned U.S. Pat. No. 4,287,232, the disclosure of which is incorporated herein by reference.

In the cloud chamber technique a layer of dry carbon and hydrophobic polymer powder is deposited on the surface of the electrode substrate by dispersing the powder as a fluidized bed in a chamber over the substrate and pulling the powder onto the upper surface of the substrate by drawing a vacuum under the substrate.

After application to the substrate, the catalyst layer is press-sintered by heating to a temperature at or above the melting point of the hydrophobic polymer yet below the decomposition point for the hydrophobic polymer while simultaneously applying a pressure above about 20 pounds per square inch absolute (psia) and below that pressure which would crush the substrate material. For carbon paper substrates, the upper pressure limit is about 100 psia. The compression at elevated temperature is continued for a time period of about 10 minutes to about 30 minutes.

A sintering temperature in the range of about 640° F. to about 670° F. is preferred for PTFE, with a temperature of about 660° F. being most preferred.

A pressure of between about 60 psia and about 100 psia is preferred with a pressure of between about 80 psia and about 100 psia being most preferred.

The electrode is simultaneously heated and compressed at a temperature and a pressure within the above ranges for a time period preferably between about 10 minutes to about 20 minutes.

EXAMPLE I

A cathode electro-catalyst was made by depositing a platinum-chromium-cobalt ternary alloy on a graphite support as described in the above cited U.S. Pat. No. 4,447,506.

The electro-catalyst was then blended with TFE-6 to obtain a mixture comprising 35 percent by weight TFE-6 and 65 percent by weight electro-catalyst.

An electrode was fabricated by first applying a layer of the electro-catalyst and TFE-6 mixture to a graphitized carbon substrate using the cloud chamber technique described in the above cited U.S. Pat. No. 4,287,232. The carbon substrate was manufactured by Union Carbide.

The layer and substrate were then placed in a Carver press which was fitted with a heater plate on each of the platens. The heater plates were thermostatically controlled to maintain a temperature of 660° F. The catalyst layer was covered with aluminum foil to prevent the layer from adhering to the platen during press-sintering. Pressure was applied to the electrode through the heated platens of the press and held at the desired pressure for the entire press-sintering time of 15 minutes. The electrode was then removed from the press and allowed to cool to room temperature.

Cathode potential values for several electrodes were obtained from a half-cell apparatus containing 99 percent by weight phosphoric acid at a cell temperature of 350° F. at a cathodic current density of 200 milliamperes/cm$^2$. The FIGURE shows the relationship between cathode performance and the pressure applied during the press-sintering process.

EXAMPLE II

A cathode electro-catalyst was made by depositing a platinum-vanadium alloy on an acetylene black support is described in the above cited U.S. Pat. No. 4,202,934.

The electro-catalyst was first dispersed in water and then an aqueous dispersion containing DuPont T-30 hydrophobic polymer was added. The mixture was stirred and the pH of the mixture was adjusted to 4.0 to induce flocculation. The floc comprised 60 percent by weight electro-catalyst and 40 percent by weight T-30 polymer.

The mixture was restirred and filtered to deposit a layer of the floc on a filter paper. The layer was then transferred to a graphitized carbon substrate. The carbon substrate was manufactured by Union Carbide. The layer and substrate were dried under a heat lamp to remove the residual water.

The layer and substrate were press-sintered according to the process described in Example 1 for 15 minutes at a temperature of 660° F. and a pressure of 75 psia.

The tolerance to electrolyte solidification cycles of the press-sintered electrode and a conventional electrode were compared. Subscale 2"×2" cells using a 99 percent by weight phosphoric acid electrolyte were continuously operated at 375° F. at 200 amperes/ft$^2$. The oxidant comprised air and the fuel comprised a mixture of 79.6 percent by weight hydrogen, 1.7 percent by weight carbon monoxide and 18.7 percent weight carbon dioxide. Once per week the cells were shut down and placed in a freezer at −25° F. for 3 days.

After the completion of six cycles, the performance of the cells was measured. The press-sintered electrode exhibited a 16 millivolt loss in cathode potential while the conventional electrode exhibited a cathode potential loss in excess of 50 millivolts.

The fuel cell electrode of the present invention provides improved peak performance and, in the case of phosphoric acid cells, improved tolerance to electrolyte solidification.

While the present invention has been described in terms of a phosphoric acid fuel cell, it will be understood by those skilled in the art that the process of the present invention is pplicable to any gas diffusion electrode having a layer of hydrophobic polymer and catalyst supported upon a porous substrate.

Although this invention has been shown and described with respect to detailed embodiments thereof, it will be understood by those skilled in the art that various changes in form and detail thereof may be made without departing from the spirit and scope of the claimed invention.

We claim:

1. A method for making a fuel cell electrode comprising applying a layer comprising a hydrophobic polymer and an electro-catalyst to one surface of a porous substrate, heating the substrate and the layer to a temperature at or above the melting temperature of the polymer and below the decomposition temperature of the polymer while simultaneously compressing the substrate and the layer at a pressure between about 20 psia and about 100 psia, and continuing the heating and compressing for a time period of between about 10 minutes and about 20 minutes, said fuel cell electrode providing increased peak performance as well as improved performance stability.

2. A fuel cell electrode made by the method of claim 1.

3. A method for generating electric current comprising feeding streams of a fuel and an oxidant to a fuel cell, said fuel cell having two electrodes and an electrolyte-containing matrix between the electrodes, each electrode having a catalyst layer coating one surface of a porous substrate comprising oxidizing the fuel at the catalyst layer of one electrode to generate a stream of electrons, conducting the electrons to a second electrode, combining the electrons with the oxidant at the catalyst layer of the second electrode, transferring ionic species through the electrolyte to complete the circuit, wherein the improvement comprises using a press-sintered electrode as at least one of the electrodes of the fuel cell, said press-sintered electrode comprising an electrode made by the method of claim 1.

* * * * *